United States Patent [19]

Kitamura et al.

[11] 4,411,154

[45] Oct. 25, 1983

[54] SWITCH FOR SENSING A PRESET POSITION OF A THROTTLE VALVE

[75] Inventors: Hidetoshi Kitamura, Higashikurume; Hirohisa Kato, Tokyo, both of Japan

[73] Assignee: Nissan Motor Company, Limited, Yokohama, Japan

[21] Appl. No.: 340,494

[22] Filed: Jan. 18, 1982

[30] Foreign Application Priority Data

Feb. 20, 1981 [JP] Japan ............................ 56-23880[U]

[51] Int. Cl.³ ............................................ G01M 15/00

[52] U.S. Cl. ........................................ 73/118; 123/339

[58] Field of Search ............... 123/319, 339, 361, 376; 200/251, 340; 73/118

[56] References Cited

U.S. PATENT DOCUMENTS

| | | | |
|---|---|---|---|
| 1,853,075 | 4/1932 | Norviel | 200/251 |
| 2,740,023 | 3/1956 | Kryder | 200/296 |
| 3,065,315 | 11/1962 | Yosenick | 200/47 |
| 3,097,273 | 7/1963 | Denner | 200/153 T |
| 3,516,279 | 6/1970 | Maziarka | 200/251 |
| 4,118,976 | 10/1978 | Mitsuda et al. | 73/118 |
| 4,245,599 | 1/1981 | Des Lauriers | 123/361 |

FOREIGN PATENT DOCUMENTS

| | | |
|---|---|---|
| 2925652 | 1/1981 | Fed. Rep. of Germany . |
| 2427675 | 12/1979 | France . |
| 2022320 | 12/1979 | United Kingdom . |

*Primary Examiner*—William A. Cuchlinski, Jr.
*Attorney, Agent, or Firm*—Schwartz, Jeffery, Schwaab, Mack, Blumenthal & Koch

[57] ABSTRACT

A switch for sensing a preset position of a throttle valve in an internal combustion engine, includes a stationary casing, a plunger movably disposed in the casing, and a throttle lever secured to the throttle valve so as to be moved along with the throttle valve. A first contact is supported on the casing. A second contact is supported on the plunger in such a manner as to contact the first contact according to the movement of the plunger. The throttle lever is so arranged as to be able to move the plunger and as to encounter the casing when the throttle lever moves, whereby the first and second contacts contact according to the movement of the throttle valve and the casing stops the movement of the throttle valve.

10 Claims, 3 Drawing Figures

SWITCH FOR SENSING A PRESET POSITION OF A THROTTLE VALVE

BACKGROUND OF THE INVENTION

1. Field of the Invention

This invention relates to a switch for sensing a preset position of a throttle valve in an internal combustion engine, and more generally to a throttle valve switch for sensing particular engine-operating conditions, such as idling.

2. Description of the Prior Art

It is known to utilize electronic devices, such as microcomputers, to control an internal combustion engine. The conventional control systems of the particular type are equipped with a throttle valve switch. The switch senses a preset position of the throttle valve corresponding to engine idling. The sensor signal indicative of engine idling is transmitted to the control system to obtain optimal engine idling operation. However, no conventional switch has been satisfactory from the standpoint of sensing accuracy.

SUMMARY OF THE INVENTION

Accordingly, it is an object of the present invention to provide a switch for sensing a preset position of a throttle valve which is adequately accurate in sensing.

It is another object of the present invention to provide a throttle valve switch which concurrently serves as a stopper for a throttle valve and is actuated according to the motion of the throttle valve to accurately sense a preset position of the throttle valve.

It is still another object of the present invention to provide a throttle valve switch which has a switching point adjustable with respect to a throttle valve.

According to the present invention, a switch for sensing a preset position of a throttle valve in an internal combustion engine, includes a stationary casing, a plunger movably disposed in the casing, and a throttle lever secured to the throttle valve so as to be moved along with the throttle valve. A first contact is supported on the casing. A second contact is supported on the plunger in such a manner as to contact the first contact according to the movement of the plunger. The throttle lever is so arranged as to be able to move the plunger and as to encounter the casing when the throttle lever moves, whereby the first and second contacts contact according to the movement of the throttle valve and the casing stops the movement of the throttle valve.

The above and other objects, features and advantages of the present invention will be apparent from the following description of a preferred embodiment thereof, taken in conjunction with the drawings.

DESCRIPTION OF THE PREFERRED EMBODIMENT

Figure 1:
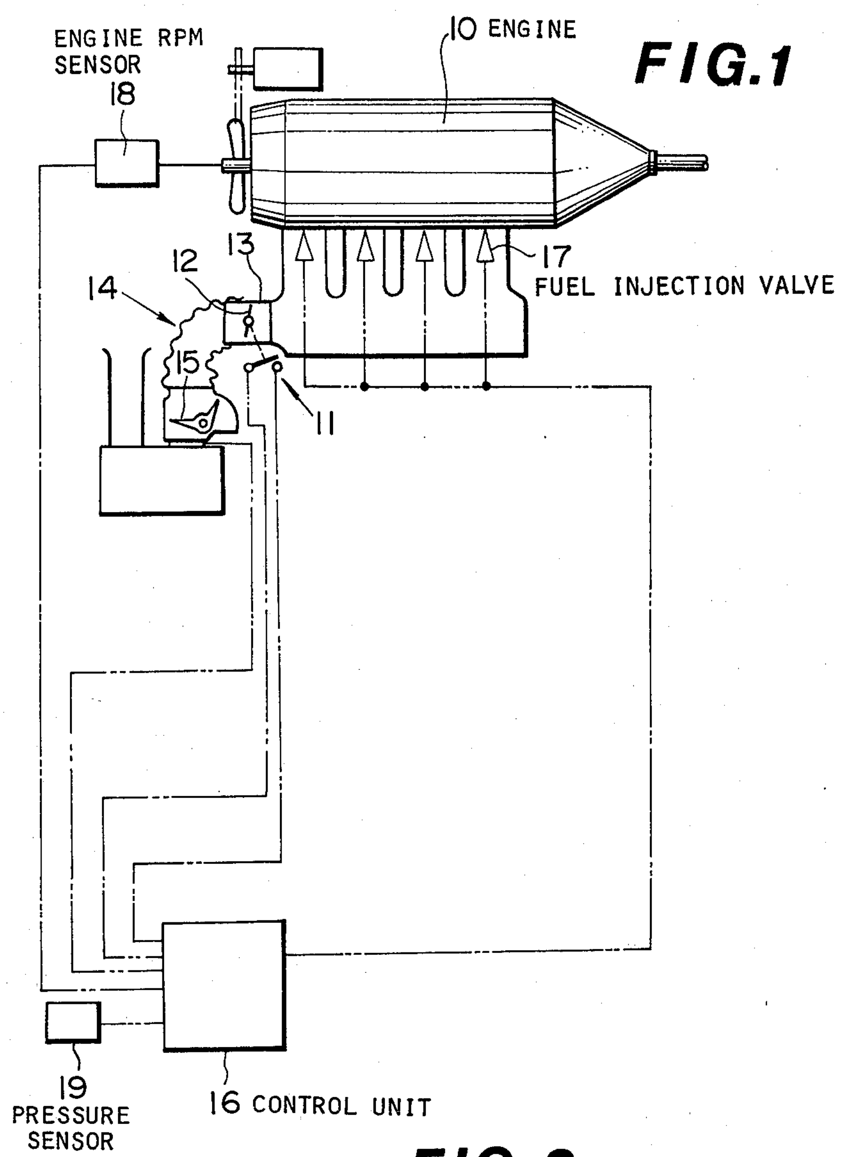
FIG. 1 is a diagrammatic view of an electronic fuel injection control system for an internal combustion engine which is equipped with a throttle valve switch of the present invention.

With reference to FIG. 1, there is shown an electronic fuel injection control system for an internal combustion engine 10 which is equipped with a throttle valve switch 11 of the present invention. The switch 11 senses a preset position of a throttle valve 12 corresponding to engine idling condition, that is, whether or not the throttle valve 12 is in the preset position. The throttle valve 12 is disposed in a chamber 13 formed in an air intake passage 14 connected to the engine 10.

An air flow meter 15 is disposed in the air intake passage 14 upstream of the throttle valve 12 to sense the rate of air flow to the engine. The air flow meter 14 outputs a signal indicative of air flow rate to a control unit 16 including a microcomputer. The control unit 16 calculates the desired amount of fuel to be injected into the engine 10 per time according to the air flow rate signal, and periodically opens fuel injection valves 17 in the passage 14 downstream of the throttle valve 12 so that fuel will be injected into the engine at a rate corresponding to the calculated value.

Sensors 18 and 19 detect engine rpm and atmospheric pressure respectively, and transmit signals indicative of engine rpm and atmospheric pressure respectively to the control unit 16. The throttle valve switch 11 outputs a signal indicative of whether or not the engine 10 is idling. The control unit 16 corrects the desired rate of fuel injected according to the signals from the sensors 18 and 19, and the switch 11 to achieve optimal engine operation under all engine operating conditions, including idling.

It should be noted that the fuel injection control system of FIG. 1 is arranged in a manner similar to that already known except for the specific structure of the throttle valve switch 11.

Figure 2:
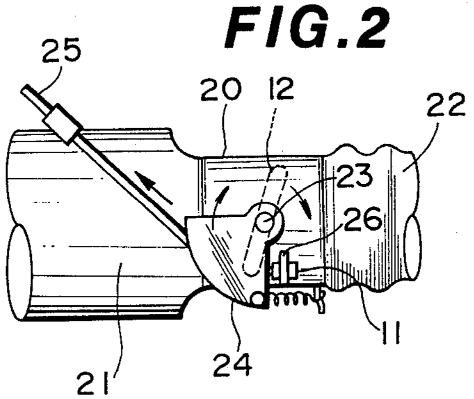
FIG. 2 is a plan view of the throttle valve switch in FIG. 1.

As shown in FIG. 2, the throttle chamber 13 is defined by a cylindrical housing 20 in which the throttle valve 12 is rotatably disposed. The ends of housing 20 are connected to the ends of upstream and downstream air intake conduits 21 and 22 respectively. The conduits 21 and 22, and the housing 20 define the air intake passage 14 (see FIG. 1). The throttle valve 12 is of the butterfly type mounted on a shaft 23 which passes diametrically through the housing 20. The ends of throttle shaft 23 are rotatably supported by the housing 20. A throttle lever 24 in the form of a circular sector is mounted, at the center of the circle defining the sector, on one end of shaft 23 outside the housing 20. As the lever 24 turns, the throttle valve 12 rotates along with the throttle shaft 23. One end of a throttle cable 25 is engaged to one peripheral corner of the throttle lever 24 and the other end thereof is engaged to an accelerator pedal (not shown) so that the throttle lever 24 will be turned to open the throttle valve 12 when the accelerator pedal is depressed.

The throttle valve switch 11 is mounted on a support 26 secured to the outer surface of the housing 20. The switch 11 is located outside the housing 20 near the throttle lever 24. The switch 11 is positioned relative to the throttle lever 24 in such a manner that one radial edge of the throttle lever 24 will come into contact with the switch 11 when the throttle valve 12 closes. The throttle valve switch 11 concurrently serves as a stopper for the throttle lever 24. Specifically, the throttle valve switch 11 is so positioned as to stop the throttle lever 24 and thus the throttle valve 12 at a preset position required for engine idling. The switch 11 is of such structure as to be switched at the substantially same time as the throttle valve 12 enters or exits from the foregoing preset position. Therefore, the throttle valve switch 11 senses precisely whether or not the throttle valve 12 is in the preset position, that is, whether or not the engine 10 is idling.

Figure 3:
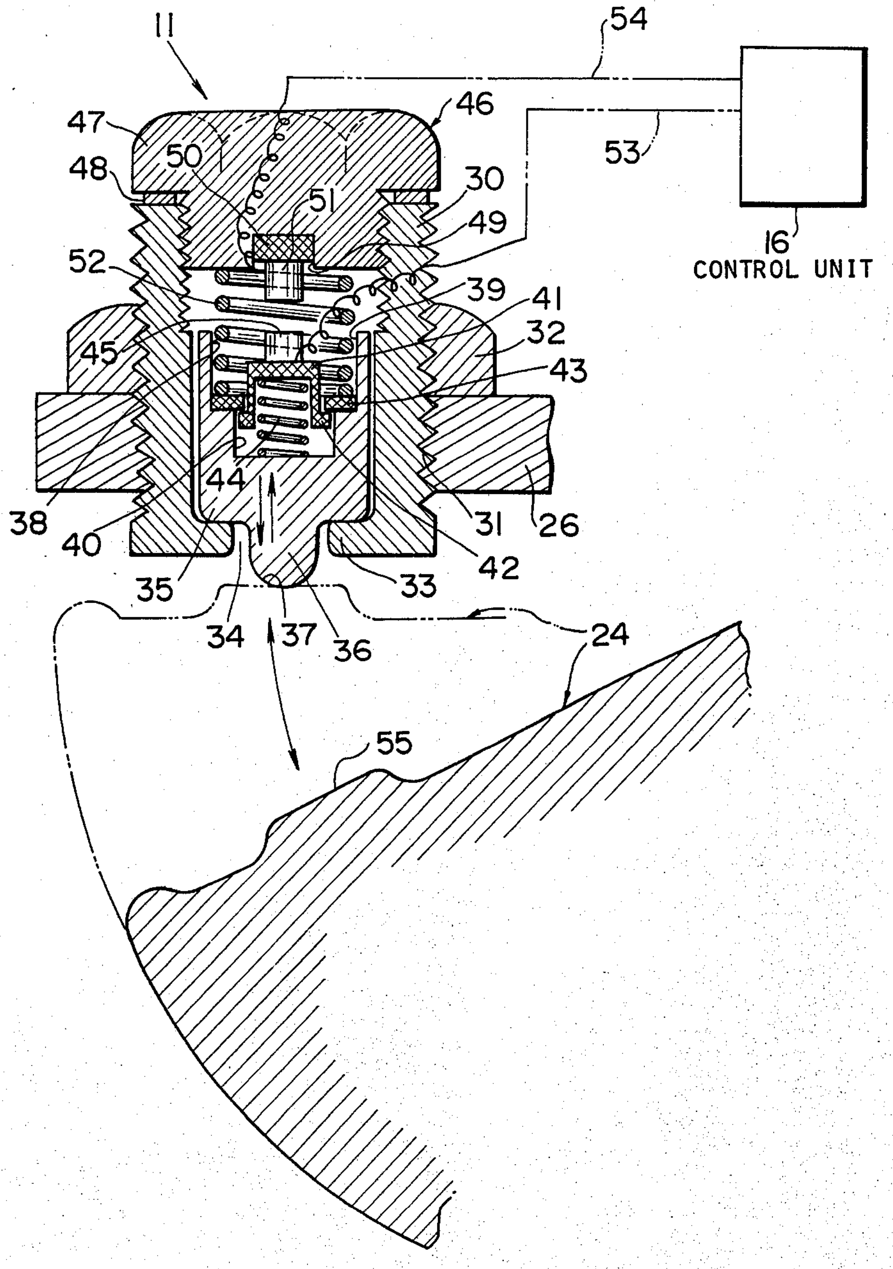
FIG. 3 is a cross-sectional view of the throttle valve switch in FIGS. 1 and 2.

Referring now to FIG. 3, the throttle switch 11 has a hollow cylindrical casing 30, the periphery of which is threaded. The casing 30 passes through a threaded hole 31 provided through the support 26 so as to be screwed accurately into position on the support 26. A nut 32 is threaded onto the casing 30 and tightened to the upper surface of support 26 so as to securely fasten the casing 30 into position with respect to the support 26. The lower end of the casing 30 is formed with a radially-inward-extending annular flange 33, which defines a central aperture 34 coaxial with the casing 30.

A plunger 35 is coaxially, slidably disposed within the casing 30. The main body of the plunger 35 is of larger diameter than that of the central aperture 34, so that the plunger 35 can be stopped by the flange 33. The lower end of plunger 35 is provided with a coaxial projection 36 having a hemispherical end 37. The projection 36 is of smaller diameter than that of the central aperture 34 and extends through the aperture 34. The projection 36 is of such length as to normally protrude beyond the lower end surface of flange 33 or casing 30.

The upper part of the plunger 35 is provided with a stepped bore 38 consisting of large and small diameter portions 39 and 40 which are coaxial with the plunger 35. The large diameter portion 39 is above the small diameter portion 40. An inverted-cup-shaped insulating member 41 is coaxially disposed in the bore 38 and has a flange 42 extending radially outward from its rim. The outside diameter of the flange 42 is slightly smaller than inside diameter of the small diameter portion 40 of the bore 38 so as to slidably fit into the small diameter portion 40. A ring 43 coaxially fits into the bottom of the large diameter portion 39 of the bore 38, and is secured to the plunger 35. The ring 43 is of inside diameter larger than that of the non-flanged portion of the insulating member 41 so that the member 41 movably passes through the ring 43, but the inside diameter of the ring 43 is smaller than the outside diameter of the flange 42 so that the ring 43 can engage with the flange 42 to prevent the insulating member 41 from coming out of the small diameter portion 40. A spring 44 is provided between the plunger 35 and the insulating member 41 to urge the member 41 away from the plunger 35. In the normal condition, the spring 44 presses the flange 42 against the ring 43 to hold the insulating member 41 at the upper limit of its travel. The upper part of the spring 44 is located inside the insulating member 41, and the lower part thereof is located in the small diameter portion 40 of the bore 38. A columnar contact 45 is coaxially secured to the top surface of the insulating member 41 so as to be electrically insulated from the plunger 35. In this way, the contact 45 is movably supported on the plunger 35 in place by means of the insulating member 41, the ring 43, and the spring 44.

The upper part of the inner surface of the casing 30 is threaded so that the threaded portion of a plug 46 can be screwed into the casing 30 in such a manner as to close the upper end of the casing 30. The plug 46 has a hexagonal head 47 at its top end. The head 47 is of corner-to-corner diameter approximately equal to the outside diameter of the casing 30. A positioning ring 48 is sandwiched between the top end of the casing 30 and the lower surface of the head 47 to determine the position of the plug 46 with respect to the casing 30. The lower surface of the plug 46 is provided with a central circular-recess 49 into which a columnar insulating member 50 is securely attached. A columnar contact 51 is coaxially secured to the lower surface of the insulating member 50 so as to be electrically insulated from the plug 46. In this way, the contact 51 is supported on the casing 30 by means of the plug 46 and the insulating member 50. The contact 51 is axially above the contact 45. Inside the casing 30, a return spring 52 is provided between the ring 43 and the plug 46 so as to urge the plunger 35 via the ring 43 in the direction away from the plug 46. In the normal condition, the spring 52 presses the plunger 35 against the flange 33 of the casing 30 with the contacts 45 and 51 separated by a predetermined interval, which can be adjusted by choosing the thickness of the positioning ring 48 between the casing 30 and the plug 46.

The contact 45 is thus movable, and is connected electrically to the control unit 16 by means of a lead 53 which extends through a hole (not shown) provided in the casing 30 or the plug 46. The contact 51 is thus stationary, and is connected electrically to the control unit 16 by means of a lead 54 which extends through a hole (not shown) provided in the casing 30 or the plug 46. The throttle valve switch 11 is positioned relative to the throttle lever 24 in such a manner that the radial edge of the throttle lever 24 comes into contact with the lower ends of the projection 36 and the casing 30 when the throttle valve (see FIGS. 1 and 2) is closed. In the normal condition in which the throttle lever 24 is separated from the projection 36, the portion of the projection 36 protruding from the lower end surface of the casing 30 is of axial length very-slightly greater than the axial distance between the contacts 45 and 51 so that the movable contact 45 will touch the stationary contact 51 very shortly before the throttle lever 24 comes into contact with the casing 30. The radial end surface of the throttle lever 24 is provided with a land 55 at the position which contacts the projection 36 and the casing 30. The position of the casing 30 relative to the throttle lever 24 can be adjusted by way of the threaded support 26, casing 30, and nut 32.

In operation, when the throttle valve (see FIGS. 1 and 2) is closed, the throttle lever 24 firstly encounters the projection 36 and pushes the plunger 35 upwards against the force of the spring 52. The movable contact 45 moves upwards along with the plunger 35. When the movable contact 45 encounters the stationary contact 51, the contacts 45 and 51 are electrically connected with each other to supply, through the leads 53 and 54, the control unit 16 with an electrical signal indicative of connection of the contacts 45 and 51, that is, the fact that the throttle valve is in a preset position which in turn depends on the position of the plug 46 relative to the casing 30 and that of the casing 30 relative to the support 26. After the connection of the contacts 45 and 51, the plunger 35 is further moved upwards to a very slight extent along with the throttle lever 24 while the spring 44 presses the movable contact 45 against the stationary contact 51 to stably sustain the connection between the contacts 45 and 51. The spring 44 allows the movable contact 45 to travel with respect to the plunger 35 after contact with the stationary contact 51. The spring 44 cushions the contacting shock on the contacts 45 and 51. When the throttle lever 24 encounters the casing 30, the throttle valve is stopped.

When the throttle valve is opened, the spring 52 returns the plunger 35 to its normal position while the spring 44 returns the insulating member 41 and thus the movable contact 45 to its normal position. At that time, when the movable contact 45 is disconnected from the stationary contact 51, the electrical connection of the contacts 45 and 51 is interrupted to supply the control unit 16 with an electrical signal indicative of the interruption of the electrical connection, that is the fact that the throttle valve is not in the preset position.

The stop position of the throttle lever 24 which determines the closed position of the throttle valve is adjusted via the threaded portions of the support 26, casing 30 and nut 32 by moving the casing 30 relative to the throttle lever 24. In this manner, the idle position of the throttle valve can also be adjusted. When the throttle valve is closed the movable contact 45 touches the stationary contact 51 a short time before the throttle lever 24 comes into contact with the casing 30 to stop the throttle valve, so that the switching action of the contacts 45 and 51 occurs at substantially the same time as the throttle valve enters the idle position. It should be understood that when the throttle valve is opened the switching action of the contacts 45 and 51 occurs at substantially the same time as the throttle valve exits from the idle position. Thus, the throttle valve switch 11 precisely senses whether or not the throttle valve is in the preset position. The replacement of the positioning ring 48 can be performed even after the attachment of the casing 30 and nut 32 to the support 26, so that adjustment of the switching point of the switch 11 is easy.

The axial distance between the contacts 45 and 51 may be set exactly equal to the axial length of the portion of the projection 36 normally protruding from the lower end surface of the casing 30 by appropriately choosing the thickness of the positioning ring 48. In this case, the electrical connection and disconnection of the contacts 45 and 51 depends very precisely upon whether the throttle valve is or is not in the idle position. The preset position of the throttle valve sensed by the switch 11 may be set somewhat away from the possible most closed position so that the switch 11 can detect the fact that the engine clearly exits from the idling condition.

It should be understood that further modifications and variations may be made in the present invention without departing from the spirit of the present invention as set forth in the appended claims.

What is claimed is:

1. A switch for sensing a preset position of a throttle valve in an internal combustion engine, comprising:

(a) a lever secured to said throttle valve for movement through a predetermined path corresponding to movement of said throttle valve;

(a) a stationary casing disposed in said path such that said lever encounters said casing when said lever moves toward the casing, whereby the throttle lever is stopped by encountering the casing;

(c) a plunger movably disposed in said casing;

(d) first means for resiliently holding said plunger normally in a position in which part of the plunger projects from the casing in said path whereby when the lever moves toward the casing and the plunger, the lever encounters the plunger first and the casing second and moves the plunger until the lever encounters the casing and is stopped by said casing;

(e) a first contact supported on the casing;

(f) a second contact and second means for movably supporting said second contact on the plunger in opposed relation to said first contact for movement with said plunger toward said first contact, such that when said lever moves toward the casing and the plunger, the second contact engages the first contact before the lever encounters the casing; and wherein (g) said second means includes means for resiliently holding the second contact normally in a position fixed with respect to the plunger in which the second contact is separated from the first contact when said plunger is held in its normal position and permitting said plunger to move slightly relative to said second contact after said first and second contacts have engaged.

2. A switch as recited in claim 1, further comprising a stationary support, and means for adjustably mounting the casing to said stationary support such that said casing may be stationary in a plurality of positions, whereby the position of the casing can be adjusted relative to the lever.

3. A switch as recited in claim 2, wherein the casing is positioned relative to the lever such that the throttle valve will be stopped at a position corresponding to engine idling condition.

4. A switch as recited in claim 1, further comprising a plug adjustably threaded to the casing, the first contact being secured to the plug to be supported on the casing, whereby the relative position between the first and second contacts can be adjusted.

5. A switch as recited in claim 4, wherein the plug is so positioned that the first and second contacts will engage each other when the throttle valve closes to a preset position corresponding to an engine idling condition.

6. A switch as recited in claim 4, wherein the first means comprises:

(a) a flange formed on the casing; and (b) a spring urging the plunger away from the plug so as to normally press the plunger against the flange on the casing.

7. A switch as recited in claim 1, further comprising an insulating member secured to the casing, the first contact being mounted on the insulating member so as to be electrically insulated from the casing.

8. A switch as recited in claim 1, further comprising an insulating member movably engaging the plunger, the second contact being mounted on the insulating member so as to be electrically insulated from the plunger.

9. A switch as recited in claim 8, wherein the second means comprises:

(a) a flange formed on the insulating member;

(b) a ring secured to the plunger; and (c) a spring urging the insulating member away from the plunger so as to normally press the flange against the ring.

10. A switch as recited in claim 1, wherein the plunger is movable in the axial direction with respect to the plunger.

* * * * *